Figure 1:
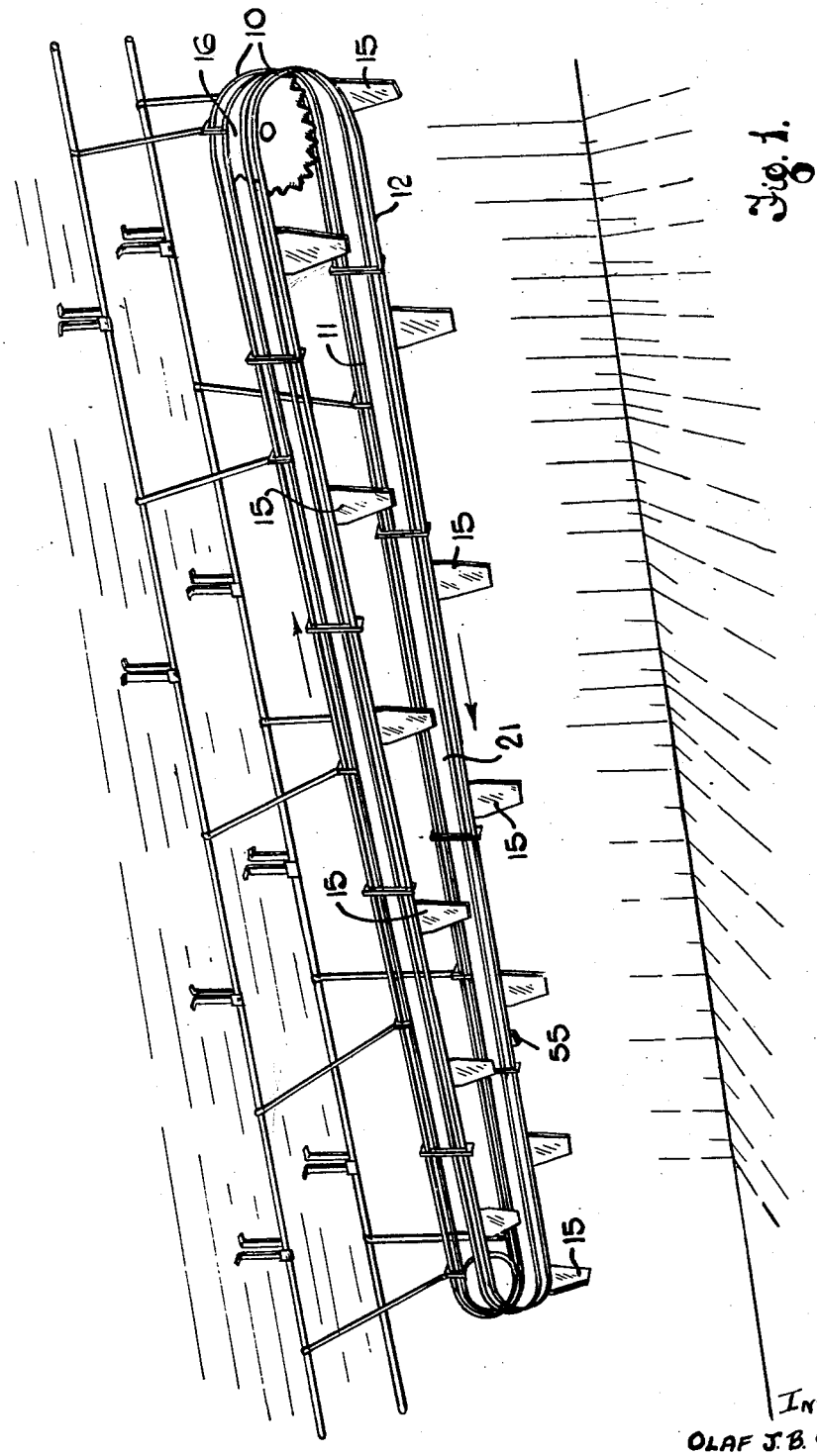

Jan. 22, 1963    O. J. B. ORWIN    3,074,357
CONVEYOR INSTALLATIONS

Filed June 12, 1961    6 Sheets-Sheet 5

INVENTOR.
OLAF J.B. ORWIN
BY
Kurt Kelman
AGENT

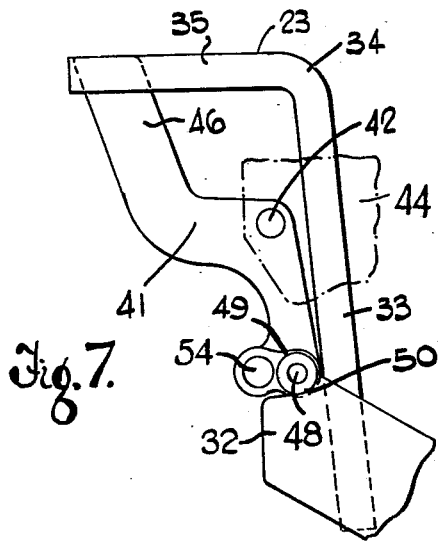
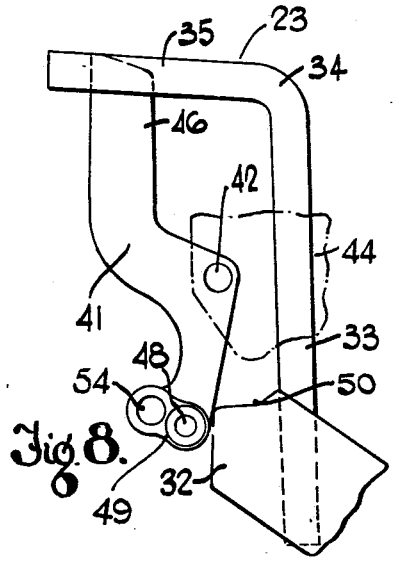

United States Patent Office 3,074,357
Patented Jan. 22, 1963

3,074,357
CONVEYOR INSTALLATIONS
Olaf J. B. Orwin, Quinton, Birmingham, England, assignor to Fisher & Ludlow Limited, Tipton, England, a British company
Filed June 12, 1961, Ser. No. 116,309
Claims priority, application Great Britain Dec. 22, 1960
11 Claims. (Cl. 104—172)

This invention relates to conveyor installations for conveying articles, the invention being concerned with that particular kind of conveyor installation which comprises a track, a driving element, a plurality of article carriers adapted to be advanced by said driving element along the track, the installation being provided at one or more locations along the length of the track with a carrier drive disengaging element, and an actuating element therefor arranged in advance of said carrier drive disengaging element and operably connected thereto, the arrangement being such that when an advancing carrier is brought to rest at one of the said locations, it engages the actuating element and displaces this from an inoperative to an operative position, thereby displacing into operative position the carrier drive disengaging element connected to said actuating element so as to disconnect the drive from the following advancing carrier for the purpose of preventing the latter from being advanced up to and colliding with the article carrier so arrested at said location.

Usually a plurality of carrier drive disengaging elements, each with an associated actuating element, would be provided at each location.

The present invention has for its object the provision of certain improvements in conveyor installations of the kind above specified.

According to the present invention, the conveyor installation is provided at each of the above-indicated locations with a carrier advance control member, means mounting said carrier advance control member so that it is displaceable relative to the track between locking and free positions in which it respectively locks an associated actuating element in its operative position or permits of such actuating element moving into its inoperative position, control member release means adapted when actuated to effect displacement of said carrier advance control member into its free position, said carrier advance control member being adapted when displaced into its free position to engage with a part of a carrier advancing from or past said location and to be thereby displaced into its locking position to retain the associated actuating element in its operative position and thus retain the corresponding carrier drive disengaging element connected thereto in its drive disengaging position and prevent the next following carrier from advancing past said location until such time as the carrier advance control member is displaced into its free position under the operation of said release means.

The present invention ensures that once a carrier has advanced beyond the location referred to, a second following carrier cannot be advanced past such location until permitted so to do by the freeing of said control member, for example, when the first carrier has reached a predetermined position in advance of said location in which it automatically operates said release means.

The control member release means may be controlled mechanically but preferably it would be controlled electrically, for example, by means of a solenoid, itself operated from a microswitch engageable by the advancing carrier at a predetermined position in advance of the location referred to.

Preferably the arrangement would be such that the control member is displaced into the free position when the solenoid is energised so that in the event of failure of the electric circuit the control member cannot thereby become incorrectly displaced into the free position.

Figure 2:
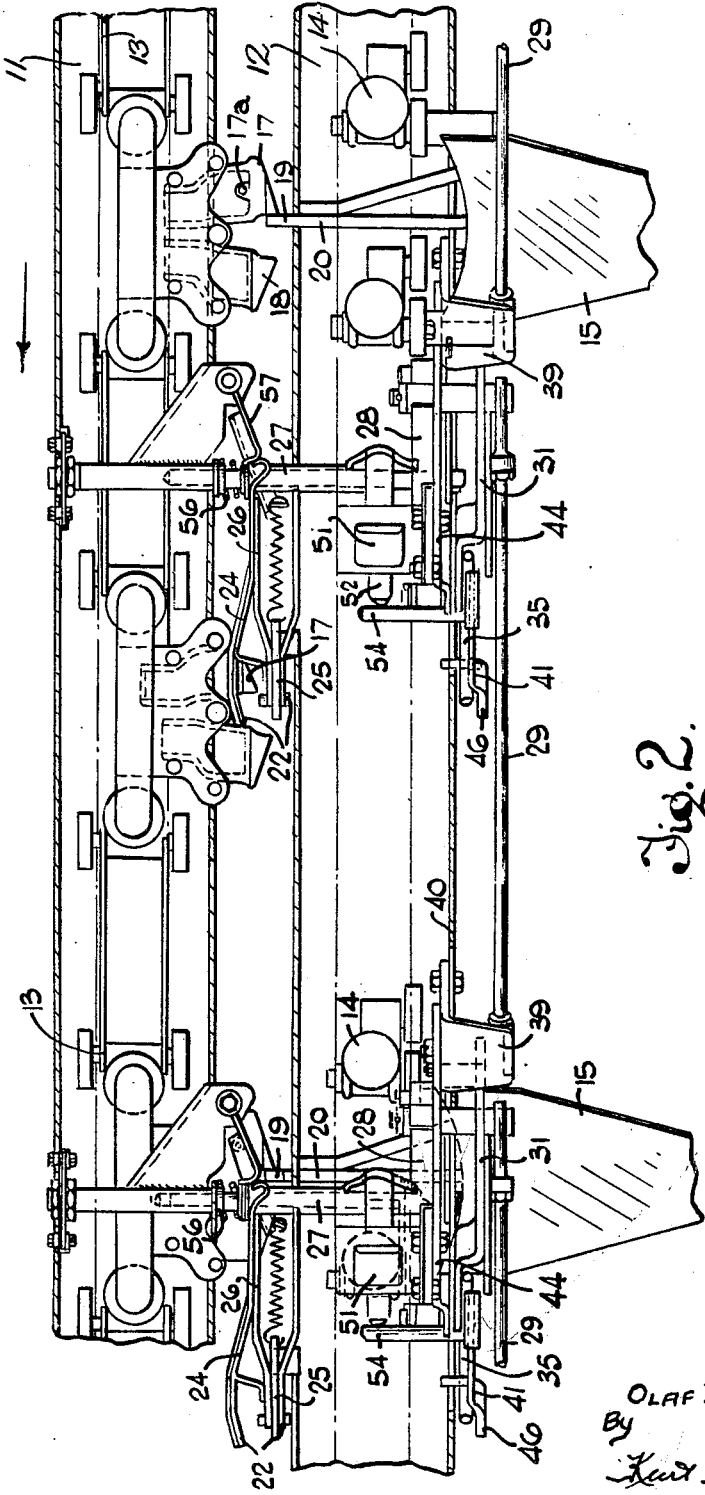
Figure 3:
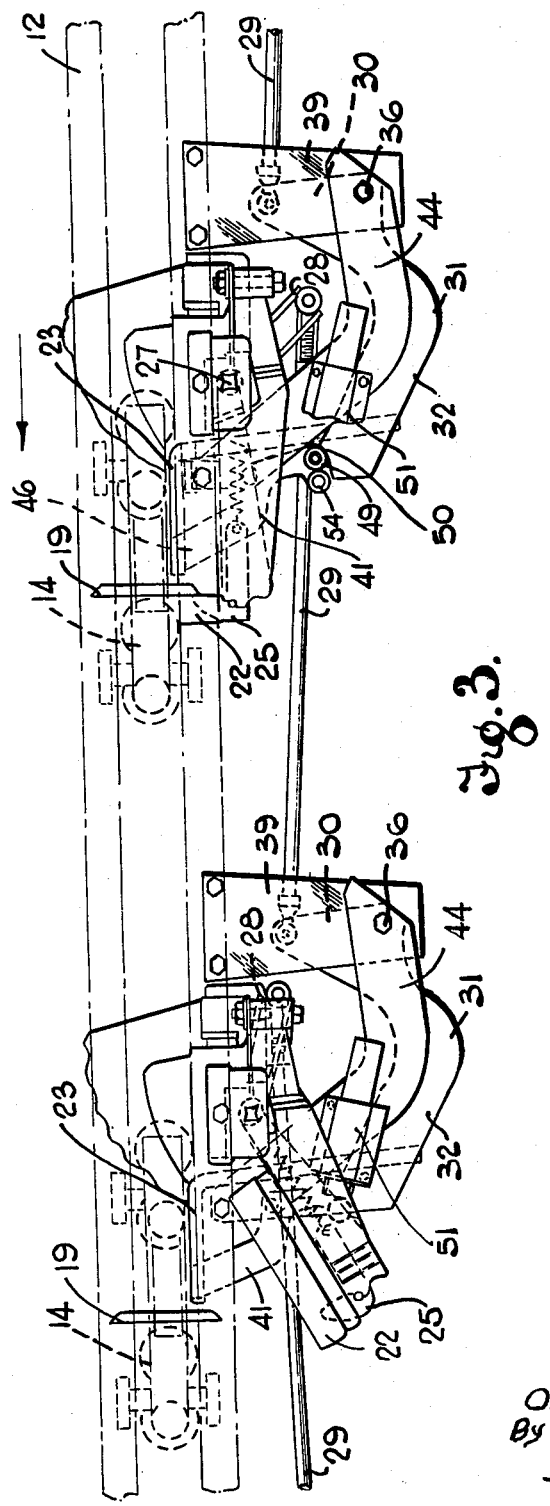
Figure 4:
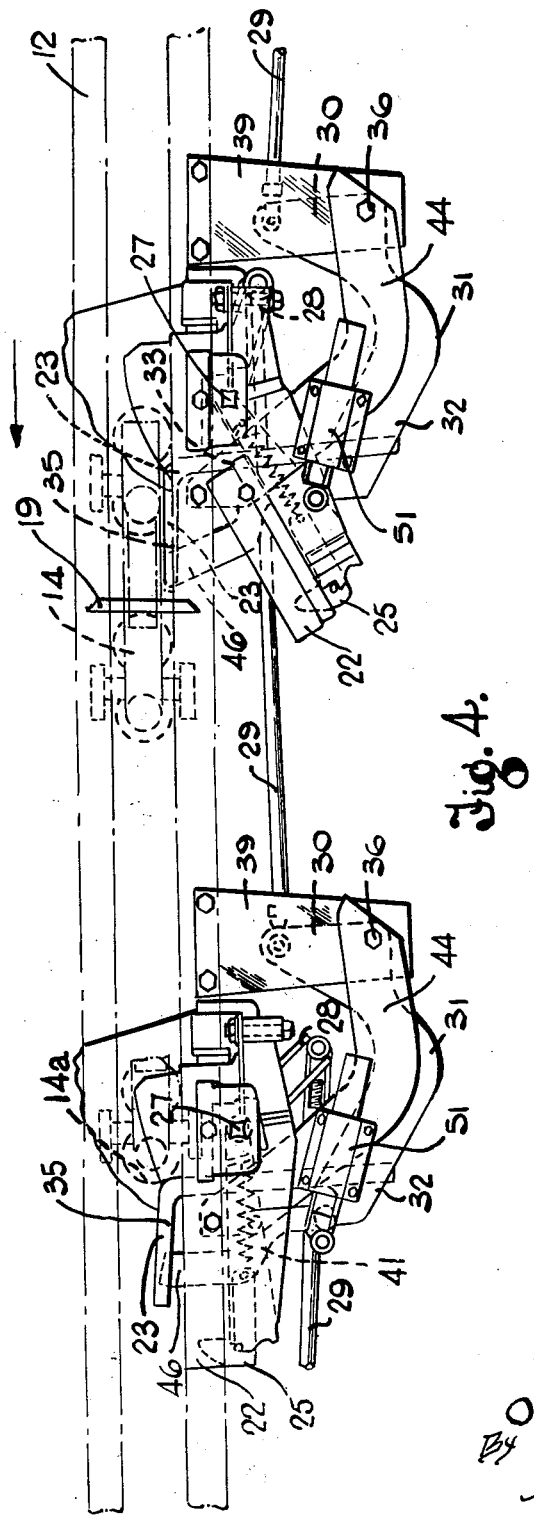
Figures 5, 6:
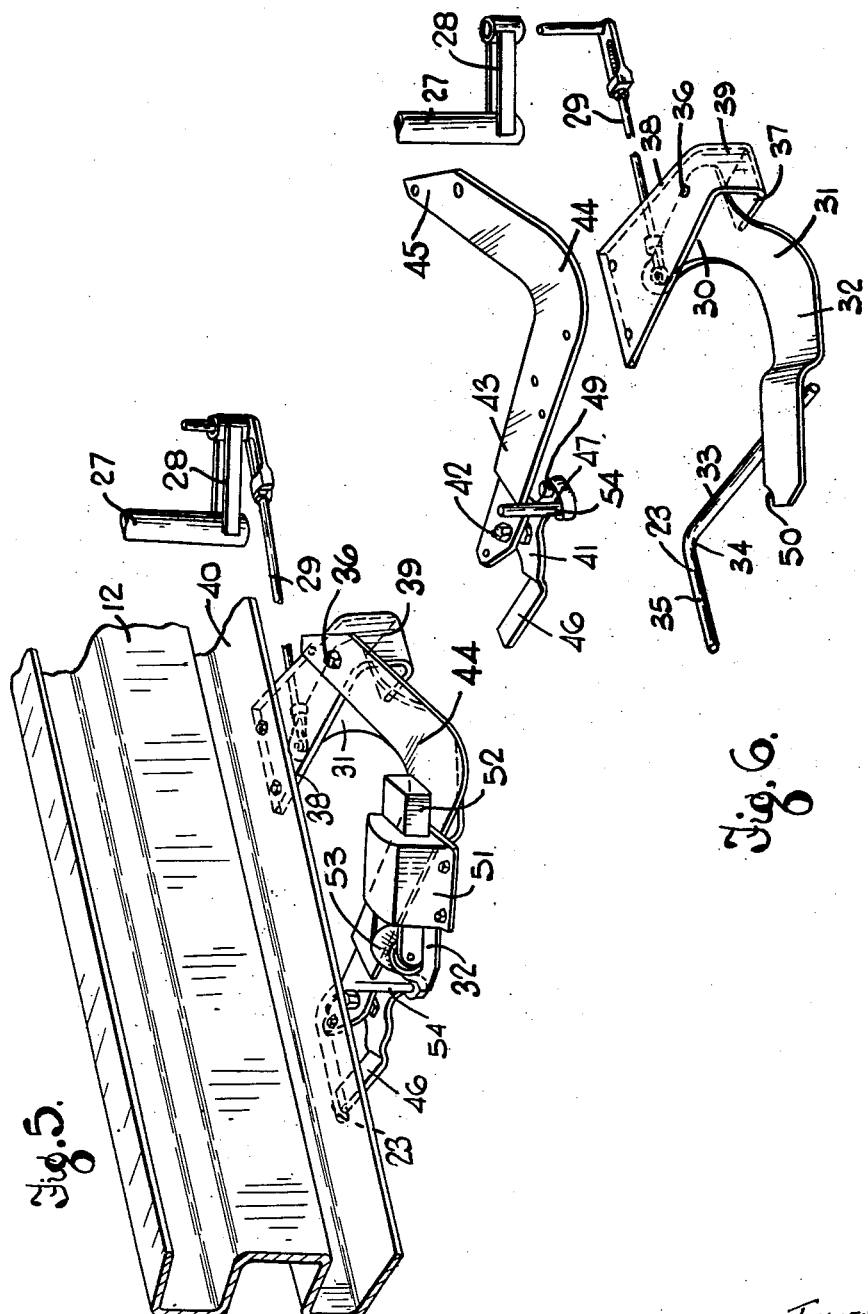

The invention is illustrated in the accompanying drawings, wherein:

FIGURE 1 is a perspective view illustrating in simplified form one construction of conveyor installation of the kind specified and embodying the present invention, FIGURE 2 is a cross sectional side view to an enlarged scale of part of the construction depicted in FIGURE 1, FIGURE 3 is a plan view of the construction depicted in FIGURE 2, with part of the track and also the driving element omitted and with the carriers which appear in the lower part of FIGURE 2 depicted in advancement of the position occupied in FIGURE 2, the parts being depicted in a position with a carrier in its arrested position, FIGURE 4 is a view similar to FIGURE 3, but showing the parts in a position for permitting advancement of a carrier, FIGURE 5 is a perspective view of part of the same construction, FIGURE 6 is a detached view of certain of the components depicted in FIGURE 5, FIGURES 7 and 8 are plan views to an enlarged scale showing the relative position of carrier advance control member and associated actuating element, when the carrier advance control member is respectively in its locking and free position.

Referring firstly to FIGURES 1 and 2 of the drawings, the conveyor installation there illustrated comprises a track 10 of endless form consisting of upper and lower sections 11, 12 which respectively support the driving element 13 in the form of an endless conveyor chain and a plurality of article carriers 14, each constructed as wheeled trolleys and provided with dependent article suspension means 15 from which the articles to be conveyed may be suspended in the known manner.

The conveyor chain 13 constituting the driving element is driven from power rotated sprocket wheel 16 in the conventional manner.

The conveyor chain 13 is provided at intervals along its length with pairs of dependent dogs 17, 18 constituting driving and retarding dogs respectively, these dogs being vertically displaceable in a manner forming no part of this invention, in relation to the chain 13 and being adapted to engage with a driving bar 19 mounted on the upper end of stem 20 provided on each carrier 14, so that these are adapted to be advanced by the conveyor chain 13 along their associated track section 12.

The conveyor installation is provided at one or more locations along the length of the track, for example, at the position depicted at 21 in FIGURE 1, with a plurality of carrier drive disengaging elements 22, each of which is operably connected to an associated actuating element 23 (see FIGURES 3 and 4), each actuating element 23 being arranged in advance of its associated carrier drive disengaging element.

For clarity in drawing, the carrier drive disengaging elements and their associated actuating elements are not shown in FIGURE 1.

The construction of the carrier drive disengaging elements 22 and their mode of operation by the actuating elements 23, forms no part of the present invention.

However, for the better understanding of the present invention, briefly each carrier drive disengaging element 22 comprises a cam portion 24 and a spring-loaded stop member 25, both mounted upon a common support 26. Each of these supports 26 is carried on an associated vertical spindle 27 supported from the adjacent track sections 11, 12. The lower end of each spindle carrying arm 28 is pivoted to the rear end of motion transmitting rod 29, using the expression "rear" in reference to the designed direction of advancement of the carriers as denoted by the arrows in FIGURES 2, 3 and 4.

The forward end of each rod 29 is pivoted to one arm 30 of a bell crank lever 31 of plate like configuration, and forming part of the aforementioned actuating element 23, the other arm 32 of which lever 31 carries one limb 33 of an L-shaped bar 34, the other limb 35 of which projects forwardly in relation to the track, i.e. in the direction of carrier advancement and is adapted to engage with the side of an advancing carrier, so that the bar 34 also forms part of the actuating element 23.

Each bell crank lever 31 is supported for pivotal movements about a vertical axis at 36 between the two limbs 37, 38 of a U-shaped supporting bracket 39, the limb 38 of which is extended and secured, as shown in FIGURE 5, to the lower horizontal outwardly extending flange 40 forming part of the carrier track section 12.

Thus each actuating element 23 is mounted for pivotal movement about a vertical axis into an inoperative position in which, as shown in the lefthand side of FIGURE 4, its limb 35 projects below the track section 12 (see FIGURES 2 and 5) into the path of an advancing carrier, so as thereby to be engaged, as shown in the lefthand portion of FIGURE 3. It may be swung in a direction away from the track into the operative position depicted in this figure, thereby through the motion transmitting rod 29 and arm 28, swinging the associated carrier drive disengaging element 22 about the axis of its spindle 27. Thus the carrier drive disengaging element 22 is swung from the inoperative position depicted in the righthand side of FIGURE 4, in which it is wholly clear of an advancing carrier, into the operative position depicted in FIGURE 3.

When the carrier drive disengaging element 22 is in the operative position depicted in FIGURE 3, its cam portion 24 is adapted to engage an abutment 17a on driving dog 17 and raise this, as shown in FIGURE 2, out of driving engagement with a carrier driving bar 19, to disengage the drive from the carrier. At the same time, the stop member 25, as best shown in FIGURE 3, is brought into engagement with the front face of carrier bar 19 to prevent this from further advancing.

Thus, when, as shown in the lefthand side of FIGURE 3, the adjacent actuating element 23 is displaced by one advancing carrier into the operative position depicted in this figure, the next following carrier (to the right in FIGURE 3) is arrested by the associated carrier drive disengaging element 22 back of this actuating element and operably connected thereto.

In accordance with the present invention, in association with each actuating element 23 is a carrier advance control member 41 adapted to control the movement of the associated actuating element from the operative to the inoperative position and thus control the displacement from the operative to the inoperative position of the carrier drive disengaging element connected to such actuating element.

Each carrier advance control member 41 is formed as a two armed lever, the construction of which is best shown in FIGURE 6, and mounted for pivotal movement at 42 about a vertical axis upon one limb 43 of an L-shaped control member supporting plate 44, the other limb 45 of which is secured to the upper side of the arm 38 and associated actuating element bracket, as shown in FIGURE 5.

The free end of limb 43 is secured to the aforementioned track flange 40.

The two arms of the lever 41 constituting the carrier advance control member comprise a carrier engaging arm 46 and an abutment supporting arm 47.

The latter carries an upstanding pin 48 on which is rotatably mounted an abutment 49 in the form of a roller, which is adapted to engage with a corresponding actuating element abutment constituted by a part-circular recess 50, formed in an edge portion of the free end of the plate-like bell crank lever arm 32 and on the edge of the free end of this arm which is directed towards the adjacent track section 12.

The arrangement is such that when the roller abutment 49 is in engagement with its recess 50, as shown in FIGURE 7, as well as less clearly in the lefthand side of FIGURE 3, the associated actuating element 23 is positively held in its operative position in which it is swung about its pivot 36 in a direction away from the associated carrier track 10, thus retaining the corresponding carrier drive disengaging element 22 in its operative position.

In this locking position of the carrier advance control member 41 depicted best in FIGURE 7, its associated carrier engaging arm 46 is displaced in a direction away from the track section 12 out of the path of an advancing carrier, as shown also in the lefthand side of FIGURE 3, as well as in FIGURE 5.

Displacement of the control member 41 from its locking position depicted in FIGURE 7 into its free position depicted in FIGURE 8 is effected by means of a solenoid 51 mounted on the upper side of limb 43 of the control member support 44, the armature 52 of which solenoid carries a roller 53 adapted, when the solenoid is energised, to have thrust engagement against stem 54, which projects upwardly from control member arm 47 adjacent to roller 49.

The solenoid is, in the arrangement illustrated, adapted to be energised from a microswitch situated forwardly, i.e. in advance thereof for the designed direction of advancement of the carriers, one such microswitch being depicted at 55 in FIGURE 1, and being engageable by an advancing carrier.

The solenoid 51, with its associated microswitch 55 together constitute control member release means, which, by virtue of the aforementioned disposition of the microswitch relative to the solenoid, is actuable from a position in advance of the control member 41.

The arrangement is such that, when the solenoid 51 is energised, its armature roller 53 strikes the adjacent abutment pin 54 of control member 41 and swings this about its pivot 42, thereby displacing the abutment 49 clear of the actuating element notch 50, bringing the member 41 into the free position depicted in FIGURE 8, in which the associated actuating element 23 is free to move into the inoperative position as depicted in the lefthand side of FIGURE 4, thereby permitting the associated carrier drive disengaging element 22 to swing into the inoperative position depicted in the righthand side of FIGURE 4 and thus, as shown, permit of the advancement of the carrier 14 shown in this latter figure.

The actuating element 23, with its associated carrier drive disengaging element 22, move respectively into their inoperative position under the pressure of return spring 56 which controls the pivotal movement of spindle 27 (see FIGURE 2).

Provision is made for locking each carrier drive disengaging element 22 in its operative position by pivoted latch 57 so as, independently of the freeing of the element 22 in the manner described, to lock an arrested carrier in the arrested position until a driving dog 17 on the conveyor chain 13 advances to a position for having driving engagement with the carrier, such driving dog being adapted to engage with and raise the latch 57, thus freeing the carrier drive disengaging element 22 and permitting it to swing into its inoperative position under the loading of spring 56.

When the carrier advance control member 41 has been displaced by the operation of solenoid 51 into its free position, its carrier engaging arm 46 now projects, as shown for example in the lefthand side of FIGURE 4, into the path of the next advancing carrier 14. Thus, when this carrier advances to the position indicated in dotted outline at 14a in FIGURE 4, in which its foremost end portion commences to engage with the adjacent actuating element bar 35 and to displace such element towards and into its operative position, the carrier as it continues to advance will thereupon now also engage with the arm 46 of the control member 41 and displace the latter into its locking position as depicted in the lefthand side of FIGURE 3. Thus, as a carrier advances past an actuating element to displace this into the operative position, the control member is then automatically displaced by the advancing carrier into a position for again locking the actuating element in its operative position, as shown in FIGURE 7, to thus lock the associated carrier drive disengaging element 22 in its operative position and thus, as shown in the righthand side of FIGURE 3, positively prevent the advancement of a further carrier until the carrier advance control member 41 has again been displaced into the free position on subsequent energisation of solenoid 51.

The armature 52 of the solenoid would be spring loaded so as to be retained out of engagement with the abutment pin 54, i.e. in the position shown in FIGURE 5, except when energised.

From the above description it will be understood that, once the carrier advance control member 41 has moved into its locking position it will remain, in such position to preclude advancement of a carrier next in rear until such time as the solenoid 51 is again energised so that, in the event of any failure of the solenoid or its associated electrical control, further advancement of the carriers is automatically prevented.

As will be clear from FIGURES 7 and 8, the actuating element abutment recess 50 engages with the control member abutment 49, along surfaces which are substantially tangential to the radius of the axis of pivoting 42 of the member 41 and it accordingly follows that the loading of spring 56 tending to displace the actuating element 23 towards the track into its inoperative position does not produce any significant reaction force on the control member 41 tending to displace this into its free position.

In the arrangement described, the solenoid 51 is a push-off solenoid, i.e. one in which its armature 52 is adapted to push against the abutment pin 54, but if desired a solenoid of the pull-off type may be provided, in which the solenoid moves in the direction the reverse of that depicted in FIGURE 5, and in such an arrangement the end of the armature carrying the roller 53 would in lieu of carrying the roller be connected to one arm of a two-armed lever, the other arm of which would be adapted to strike the abutment pin 54 in like manner to the roller 53.

What I claim then is:

1. In a conveyor installation of the kind specified for conveying a succession of article carriers, an actuating element arranged at a location along the length of the conveyor track, a carrier drive disengagement element situated rearwardly of the actuating element in the direction of advancement of the article carriers, means operably connecting said actuating element to said carrier drive disengaging element, a carrier advance control member, means mounting said carrier advance control member so that it is displaceable relative to the conveyor track between locking and free positions in which it respectively locks an associated actuating element in its operative position or permits said actuating element to move into its inoperative position, a control member release device, means for operating said release device when an associated one of said carriers has advanced from a predetermined distance beyond said actuating element, means connecting said operating means to said control member release device to effect displacement of said carrier advance control member into its free position, said carrier advance control member being adapted when displaced into its free position to engage with a part of a carrier advancing from or past said location and to be thereby displaced into its locking position to retain the associated actuating element in its operative position and thus retain the corresponding carrier drive disengaging element connected thereto in its drive disengaging position and prevent the next following one of said carriers from advancing past said location until such time as the carrier advance control member is displaced into its free position under the operation of said release device.

2. In a conveyor installation of the kind specified for conveying a succession of article carriers, an actuating element arranged at a location along the length of the conveyor track, a carrier drive disengagement element situated rearwardly of the actuating element in the direction of advancement of the article carriers, means operably connecting said actuating element to said carrier drive disengaging element, a carrier advance control member comprising two connected together portions, means mounting said carrier advance control member for pivotal movement about a substantially vertical axis so that it is displaceable relative to the conveyor track between locking and free positions in which one of said two connected together portions of said control member is adapted respectively to lock an associated actuating element in its operative position or permit said actuating element to move into its inoperative position, a control member release device, means for operating said release device when an associated one of said carriers has advanced from a predetermined distance beyond said actuating element, means connecting said operating means to said control member release device to effect displacement of said carrier advance control member into its free position, said carrier advance control member being adapted when displaced into its free position to engage with a part of a carrier advancing from or past said location and to be thereby displaced into its locking position to retain the associated actuating element in its operative position and thus retain the corresponding carrier drive disengaging element connected thereto in its drive disengaging position and prevent the next following carrier from advancing past said location until such time as the carrier advance control member is displaced into its free position under the operation of said release device.

3. A conveyor installation according to claim 2 wherein the control member is formed with an abutment adapted to engage with an abutment face on the actuating element to retain the latter in its operative position.

4. A conveyor installation according to claim 2 wherein the actuating element comprises a part of strip-like configuration, an edge portion of which strip is formed with a recess, said control member being formed with an abutment adapted to engage within said recess and lock the actuating element in its operative position.

5. A conveyor installation according to claim 2 wherein the actuating element recess is so formed as to be adapted with the actuating element in its operative position to engage with a face of the abutment on the carrier advance control member which is tangential in relation to the radius passing through the axis of pivoting of said control member, the arrangement being such that the actuating element applies to the control member through said inter-engaging abutment faces the minimum of force tending to displace said control member out of its locking position.

6. A conveyor installation according to claim 1 wherein the actuating element and the associated carrier advance control member are both mounted for pivotal movement about mutually parallel axes upon a common supporting bracket which is connected to the adjacent part of the conveyor track.

7. A conveyor installation according to claim 1 wherein the actuating element is mounted for pivotal movement between the two limbs of a U-shaped bracket mounted upon the adjacent part of the conveyor track, one limb of which bracket supports one end of an arm, the opposite end of which arm is also connected to an adjacent part of the track and to which arm is pivotally connected the carrier advance control member.

8. A conveyor installation according to claim 1 wherein the means for operating said control member release device is so arranged as to be actuable from a position situated in advance of the carrier advance control member, i.e. forwardly of said control member in the designed direction of advancement of the carriers along the track.

9. A conveyor installation according to claim 1 wherein the means for operating said control member release device is adapted to be operated automatically to effect displacement of the control member into its free position on the advancement of a carrier to a predetermined position along the length of the conveyor installation.

10. A conveyor installation according to claim 1 wherein the means for operating said control member release device is adapted to be operated automatically to effect displacement of the control member into its free position on the advancement of a carrier to a predetermined position along the length of the conveyor installation and said control member release device comprising a solenoid operable from a microswitch engageable by an advancing carrier, the armature of which solenoid is adapted to displace the carrier advance control member from its locking to its free position.

11. A conveyor installation according to claim 1 wherein the means for operating said control member release device comprises a solenoid operable from a microswitch engageable by an advancing carrier, the armature of which solenoid is adapted to displace the carrier advance control member from its locking to its free position, the arrangement being such that the solenoid is adapted to displace the control member into the free position when the solenoid is energised so that in the event of failure of the electric circuit the control member cannot thereby become incorrectly displaced into the free position.

References Cited in the file of this patent
UNITED STATES PATENTS

| | | |
|---|---|---|
| 2,635,555 | Hansson | Apr. 21, 1953 |
| 2,950,688 | King | Aug. 30, 1960 |